US012801705B2

(12) United States Patent
Fukuda

(10) Patent No.: US 12,801,705 B2

(45) Date of Patent: Nov. 17, 2026

(54) INFORMATION PROCESSING SYSTEM WITH AUTHENTICATION SERVER

(71) Applicant: Kioxia Corporation, Tokyo (JP)

(72) Inventor: Riichi Fukuda, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 103 days.

(21) Appl. No.: 18/738,182

(22) Filed: Jun. 10, 2024

(65) Prior Publication Data

US 2024/0427859 A1 Dec. 26, 2024

(30) Foreign Application Priority Data

Jun. 20, 2023 (JP) ................................ 2023-101126

(51) Int. Cl.

| | |
|---|---|
| ***G06F 21/00*** | (2013.01) |
| ***G06F 21/31*** | (2013.01) |
| ***G06F 21/60*** | (2013.01) |

(52) U.S. Cl.

CPC ............ *G06F 21/31* (2013.01); *G06F 21/602* (2013.01)

(58) Field of Classification Search

None

See application file for complete search history.

(56) References Cited

U.S. PATENT DOCUMENTS

| | | | | |
|---|---|---|---|---|
| 9,626,531 | B2 | 4/2017 | Natarajan et al. | |
| 10,509,735 | B2 | 12/2019 | Isozaki et al. | |
| 10,713,350 | B2 | 7/2020 | Mehta et al. | |
| 2017/0272427 | A1 * | 9/2017 | Robison .............. | H04L 63/0853 |
| 2019/0236032 | A1 * | 8/2019 | Isozaki ............... | G06F 12/1458 |

* cited by examiner

*Primary Examiner* — Andrew J Steinle

(74) *Attorney, Agent, or Firm* — Foley & Lardner LLP

(57) ABSTRACT

An information processing system includes a memory system including a memory configured to store data; a host attachable to the memory system; and an authentication server. The host includes a user interface configured to transmit an initialization command to a command generator when an input is received from a user, generate user identification information for identifying the user, and transmit the generated user identification information to a first user authenticator. The command generator can transmit a first command, causing the memory system to start the initialization of the memory when the initialization command is received.

16 Claims, 3 Drawing Sheets

INFORMATION PROCESSING SYSTEM WITH AUTHENTICATION SERVER

CROSS-REFERENCE TO RELATED APPLICATION

This application is based upon and claims the benefit of priority from Japanese Patent Application No. 2023-101126, filed Jun. 20, 2023, the entire contents of which are incorporated herein by reference.

FIELD

Embodiment described herein relate generally to an information processing system and an information processing method.

BACKGROUND

In a self-encrypting drive (SED) in accordance with a trusted computing group (TCG) standard, a revert function for initializing the SED is implemented. In order to execute the revert function of the SED, a character string (physical presence security identifier (PSID)) printed on the SED may be designated. Since the PSID is printed on the SED, a third party may easily refer to the PSID. In this case, the third party may execute the revert function. Therefore, the SED is in a state of low security.

DETAILED DESCRIPTION

Figure 1:
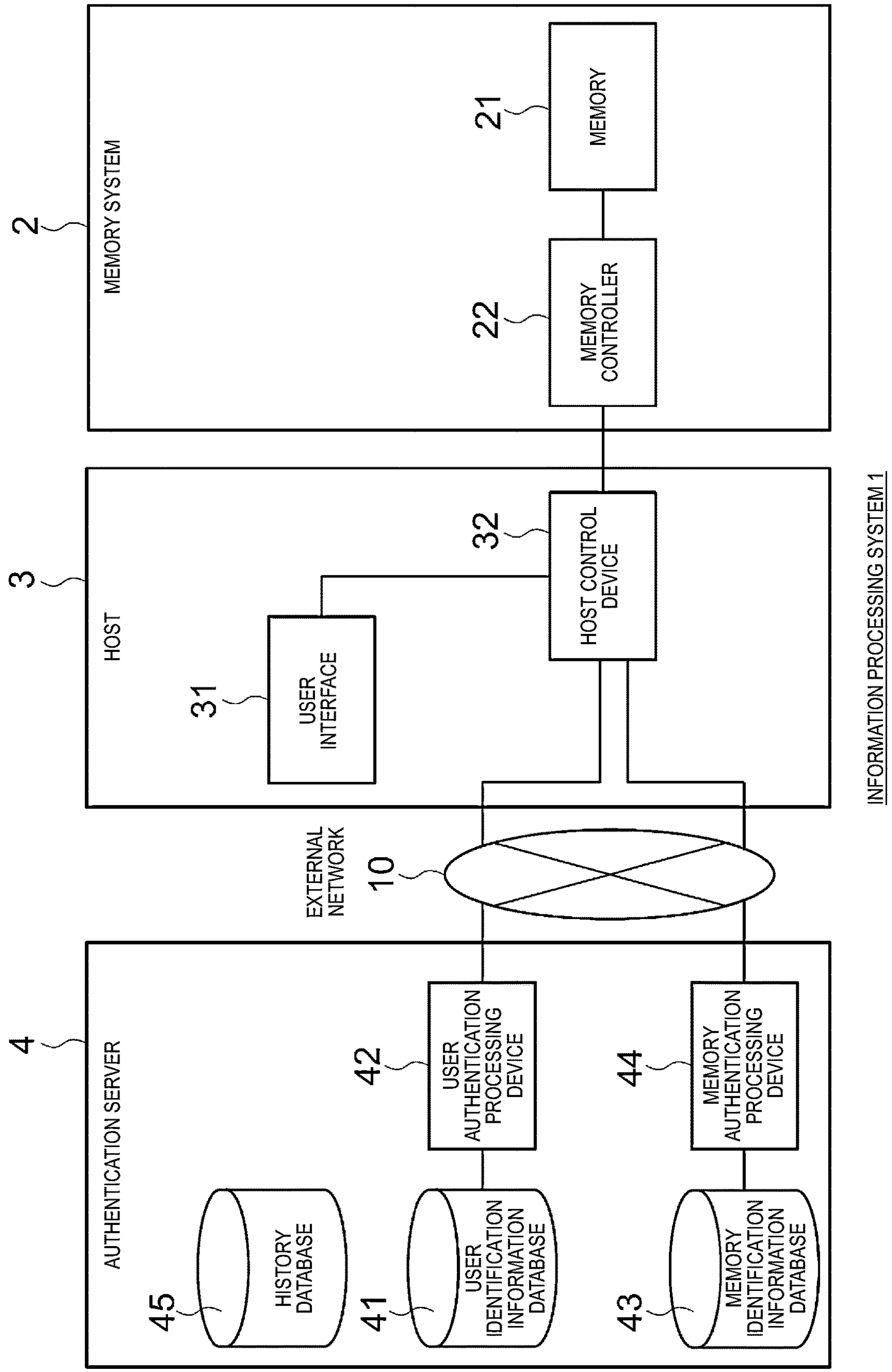
FIG. 1 is a block diagram showing an example of a configuration of an information processing system according to a first embodiment.

Embodiments provide an information processing system and an information processing method capable of improving security.

In general, according to one embodiment, an information processing system includes a memory system including a memory configured to store data; a host attachable to the memory system; and an authentication server located separately from the memory system and the host. The host includes a user interface configured to receive input information from a user, a command generator configured to generate a command related to initialization of the memory, and a first user authenticator configured to authenticate the user based on confirming whether the input information of the user matches preset information, between the host and the authentication server. The memory system includes an initialization processor configured to initialize the memory. The authentication server includes a second user authenticator configured to authenticate the user. The user interface of the host is configured to transmit an initialization command to the command generator when the input from the user is received, generate user identification information for identifying the user based on the input from the user, and transmit the generated user identification information to the first user authenticator. The command generator of the host is configured to transmit a first command, causing the memory system to start the initialization of the memory to the initialization processor when the initialization command is received. The initialization processor of the memory system is configured to transmit a first user authentication request for requesting authentication of the user, to the first user authenticator when the first command is received. The first user authenticator of the host is further configured to transmit a second user authentication request for requesting the authentication of the user, and the user identification information to the second user authenticator when the user identification information and the first user authentication request are received. The second user authenticator of the authentication server is configured to generate user authentication result information based on the user identification information when the second user authentication request and the user identification information are received.

Hereinafter, embodiments of the present disclosure will be described with reference to the drawings. In the specification and drawings, the same elements are denoted by the same reference numerals.

First Embodiment

FIG. 1 is a block diagram illustrating an example of a configuration of an information processing system 1 according to a first embodiment.

The information processing system 1 includes a memory system 2, a host 3, and an authentication server 4. The memory system 2 and the host 3 communicate data to and from each other via an interface such as NVMe (TM) (PCIe (TM)).

The memory system 2 is a storage equipped with a data protection function. The memory system 2 is, for example, a solid state drive (SSD). In addition, the memory system 2 may be, for example, a hard disk drive (HDD). The data protection function is a protection function in accordance with a trusted computing group (TCG). The data protection function is, for example, a protection function with an encryption that encrypts and accumulates the data. In addition, the data protection function is, for example, a protection function with a lock that prohibits access from a person other than a certain person to a region allocated to the certain person. In addition, the data protection function is, for example, a protection function with both the encryption and the lock.

The host 3 is a processing device outside the memory system. The host 3 is, for example, a server or a personal computer (PC). The host 3 is used to perform revert to the memory system 2. The "revert" is to initialize a memory 21 of the memory system 2. Hereinafter, the initialization of the memory 21 is also referred to as revert. The host 3 is attachably and detachably connected to the memory system 2. The host 3 may be connected to an external network 10 in a communicable manner.

The authentication server (authentication device) 4 performs authentication of the user and authentication of the memory system 2 in which the revert is performed. The authentication of the user is to confirm whether the input information of the user matches the preset information. The authentication of the memory system 2 is to confirm whether the memory 21 of the memory system 2 is revertible. The authentication server 4 is disposed outside the memory system 2 and the host 3.

Next, a configuration of the memory system 2 will be described.

The memory system 2 includes the memory 21 and a memory controller 22.

The memory 21 is a memory that stores data in a non-volatile manner. The memory 21 is, for example, a NAND type flash memory.

The memory controller 22 is a controller circuit that controls the memory 21. The memory controller 22 may include a single processor or a plurality of processors. The memory controller 22 is, for example, a central processing unit (CPU).

Next, a configuration of the host 3 will be described.

The host 3 includes a user interface 31 and a host control device 32.

The user interface 31 is a device that receives input of information from a user. The input from the user is, for example, user identification information, information for specifying the memory system 2 in which the initialization of the memory 21 is performed, a physical presence security identifier (PSID), and a revert command. The PSID is a character string unique to the memory system 2. The PSID is, for example, a character string having 32 or less digits. The user interface 31 includes, for example, a mouse, a keyboard, a microphone (voice input), or a touch pad.

The host control device 32 is a control device that communicates information between the memory system 2 and the host 3, communicates information between the authentication server 4 and the host 3, and performs a control process of the host 3. The host control device 32 is, for example, a CPU.

Next, a configuration of the authentication server 4 will be described.

The authentication server 4 includes a user identification information database 41, a user authentication processing device 42, a memory identification information database 43, a memory authentication processing device 44, and a history database 45. The user authentication processing device 42 and the memory authentication processing device 44 may be configured with a single processor or a plurality of processors.

The user identification information database (hereinafter reference to user identification information storage unit) 41 is a storage device that stores user identification information. The user identification information database 41 stores user identification information of a user who can initialize the memory 21. The user identification information is information for identifying the user.

The user authentication processing device 42 is an information processing device that performs authentication of a user. The user authentication processing device 42 performs the authentication of the user with reference to the user identification information database 41.

The memory identification information database (memory identification information storage unit) 43 is a storage device that stores memory identification information. The memory identification information is information for identifying the memory system 2, such as a serial number.

The memory authentication processing device 44 is an information processing device that performs authentication of the memory system 2. The memory authentication processing device 44 refers to the memory identification information database 43 to perform the authentication of the memory system 2. The memory authentication processing device 44 is also capable of performing authentication on a memory system of a specific manufacturer by using identification information such as the serial number.

The history database 45 is a storage device that stores management information of the memory system 2 and a maintenance history. The maintenance history includes an execution record of the revert for each memory system 2. A block chain technique may be used in the history database 45.

Next, a functional configuration of the memory controller 22 and the host control device 32 will be described.

Figure 2:
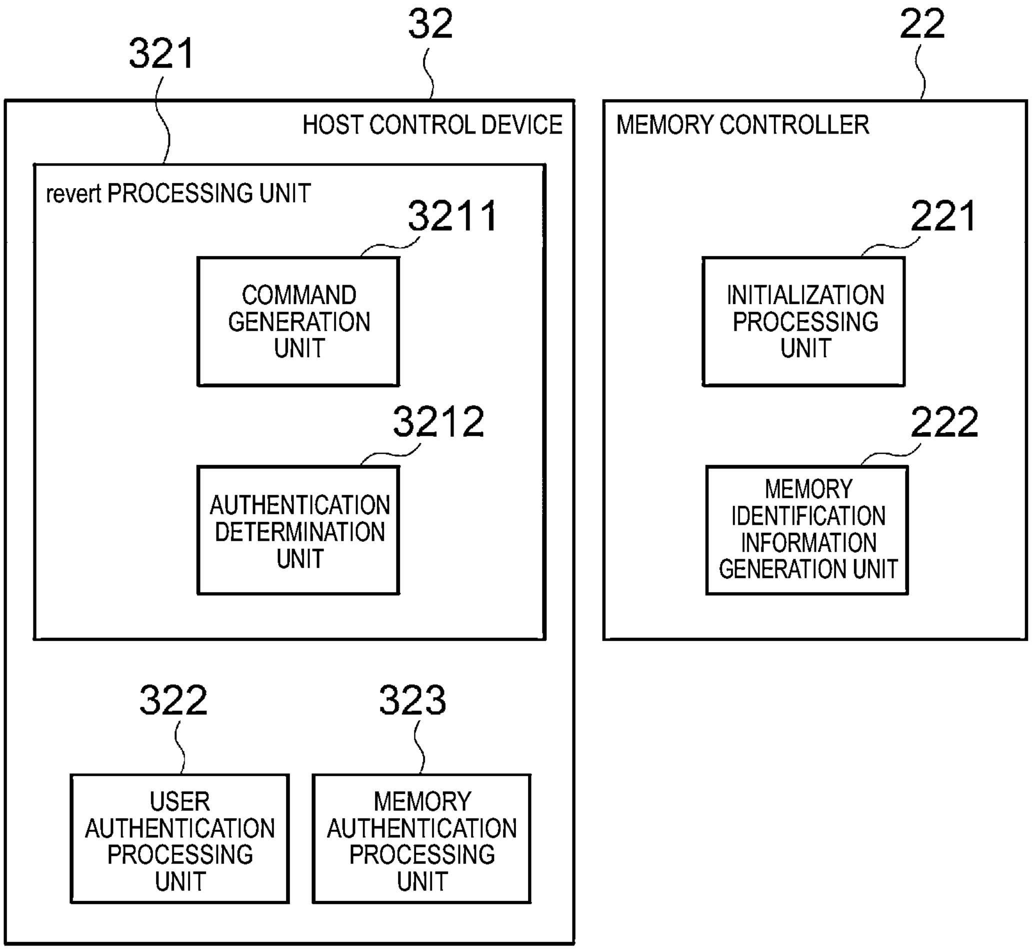
FIG. 2 is a block diagram showing an example of a functional configuration of a memory controller and a host control device according to the first embodiment.

FIG. 2 is a block diagram showing an example of a functional configuration of the memory controller 22 and the host control device 32 according to the first embodiment.

The host control device 32 includes a revert processing unit (or processor) 321, a user authentication processing unit (or processor) 322, and a memory authentication processing unit (or processor) 323.

The revert processing unit 321 is a functional unit of the host control device 32 that performs processing related to the revert between the host control device 32 and the memory system 2.

The user authentication processing unit 322 is a functional unit of the host control device 32 that performs processing related to the authentication of the user between the host control device 32 and the authentication server 4.

The memory authentication processing unit 323 is a functional unit of the host control device 32 that performs processing related to the authentication of the memory system 2 between the host control device 32 and the authentication server 4.

The memory controller 22 includes an initialization processing unit (or processor) 221 and a memory identification information generation unit 222.

The initialization processing unit 221 is a functional unit of the memory controller 22 that initializes the memory 21.

The memory identification information generation unit 222 is a functional unit of the memory controller 22 that generates the memory identification information.

Next, functional units of the revert processing unit 321 will be described.

The revert processing unit 321 includes a command generation unit 3211 and an authentication determination unit 3212.

The command generation unit 3211 is a functional unit of the revert processing unit 321 that generates a command related to the start of the revert. The command generation unit 3211 generates a first revert start command (first initialization start command) when the revert command (initialization command) input from the user is received. The first revert start command is an instruction causing the memory system 2 to generate the memory identification information. The memory identification information is information for identifying the memory system 2.

The authentication determination unit 3212 is a functional unit of the revert processing unit 321 that performs the authentication determination of the user. The authentication determination unit 3212 determines whether the user is authenticated.

Next, an operation of the information processing system 1 will be described.

Figure 3:
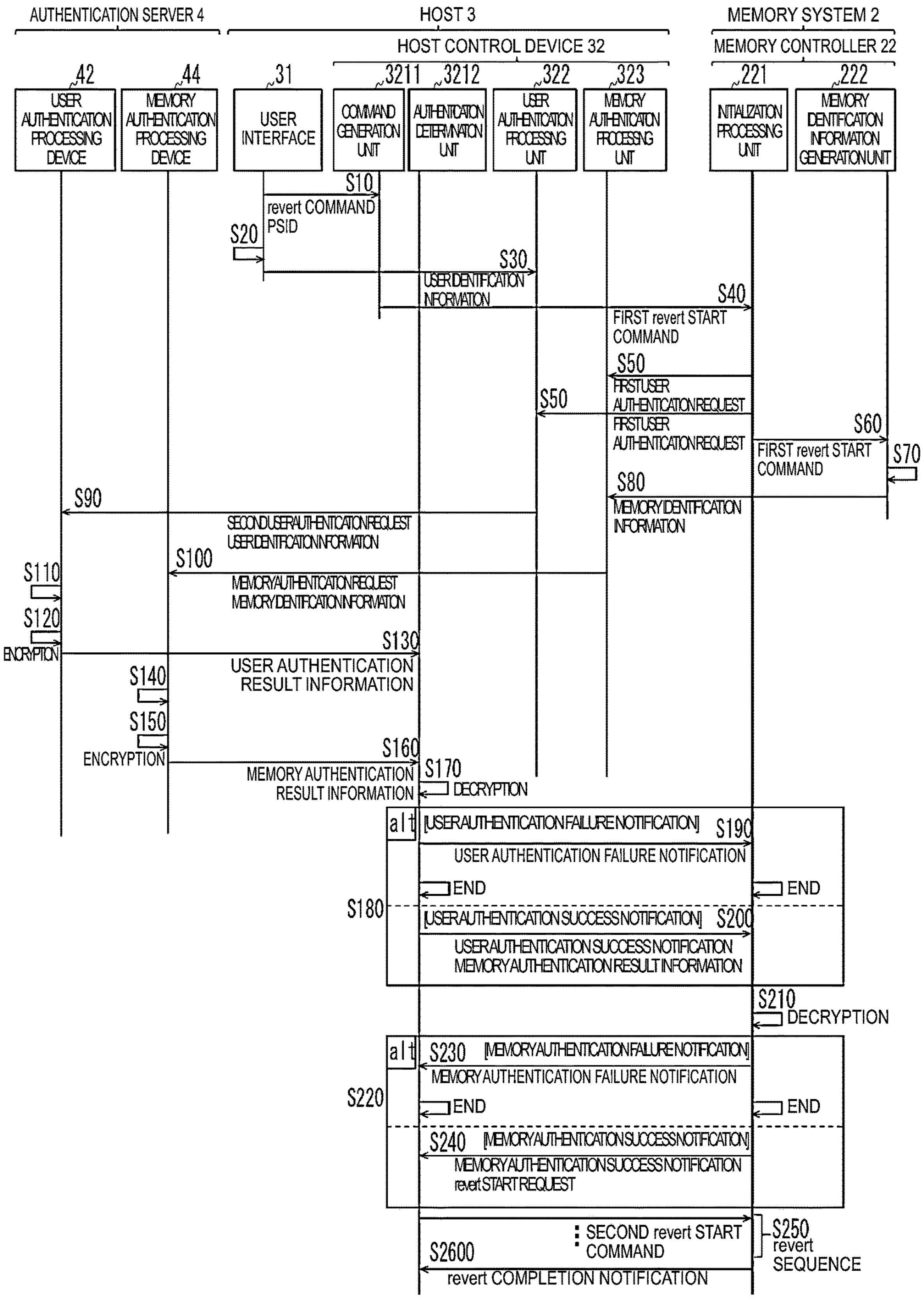
FIG. 3 is a sequence diagram showing an example of an operation of the information processing system according to the first embodiment.

FIG. 3 is a sequence diagram showing an example of an operation of the information processing system 1 according to the first embodiment.

When an input from user is received, the user interface 31 of the host 3 transmits the revert command (initialization command) and the PSID to the command generation unit 3211 (S10).

In addition, the user interface 31 generates the user identification information based on the received input from the user (S20). The user identification information is information for identifying the user.

The user interface 31 transmits the generated user identification information to the user authentication processing unit 322 of the host 3 (S30).

When the revert command and the PSID are received, the command generation unit 3211 transmits the first revert start command (initialization start command) to the initialization processing unit 221 of the memory system 2 corresponding to the received PSID (S40).

When the first revert start command is received, the initialization processing unit 221 transmits a first user authentication request to the user authentication processing unit 322 and the memory authentication processing unit 323 of the host 3 (S50). The first user authentication request is an instruction for requesting the authentication of the user.

In addition, when the first revert start command is received, the initialization processing unit 221 transmits the first revert start command to the memory identification information generation unit 222 (S60).

When the memory identification information generation unit 222 receives the first revert start command from the initialization processing unit 221, the memory identification information generation unit 222 generates the memory identification information of the memory system 2 (S70). The memory identification information is information for identifying the memory system 2. The memory identification information is, for example, a serial number.

The memory identification information generation unit 222 transmits the generated memory identification information to the memory authentication processing unit 323 of the host 3 (S80).

When the user identification information and the first user authentication request are received, the user authentication processing unit 322 transmits a second user authentication request and the user identification information to the user authentication processing device 42 of the authentication server 4 (S90). The second user authentication request is an instruction for requesting the authentication of the user to the authentication server 4.

In addition, when the first user authentication request and the memory identification information are received, the memory authentication processing unit 323 transmits the memory authentication request and the memory identification information to the memory authentication processing device 44 of the authentication server 4 (S100). The memory authentication request is an instruction for requesting the authentication of the memory system 2 to the authentication server 4.

When the second user authentication request and the user identification information are the user received, authentication processing device 42 generates the user authentication result information based on comparison between the user identification information stored in advance in the user identification information database 41 and the received user identification information (S110). The user authentication result information is information including a user authentication success notification or a user authentication failure notification. The user authentication success notification is information indicating that the authentication of the user is successful. The user authentication failure notification is information indicating that the authentication of the user is failed.

The user authentication processing device 42 encrypts the generated user authentication result information (S120). The user authentication processing device 42 performs the encryption using a first encryption key stored in the user authentication processing device 42 or acquirable by the user authentication processing device 42. The first encryption key is a common key used for encryption and decryption of the user authentication result information.

The user authentication processing device 42 transmits the encrypted user authentication result information to the authentication determination unit 3212 of the host 3 (S130).

In addition, when the memory authentication request and the memory identification information are received, the memory authentication processing device 44 generates the memory authentication result information based on a comparison between the memory identification information stored in advance in the memory identification information database 43 and the received memory identification information (S140). The memory authentication result information is information including a memory authentication success notification or a memory authentication failure notification. The memory authentication success notification is information indicating that the authentication of the memory system 2 is successful. The memory authentication failure notification is information indicating that the authentication of the memory system 2 is failed.

The memory authentication processing device 44 encrypts the generated memory authentication result information (S150). The memory authentication processing device 44 performs the encryption using a second encryption key stored in the memory authentication processing device 44 or acquirable by the memory authentication processing device 44. The second encryption key is a common key used for encryption and decryption of the memory authentication result information.

The memory authentication processing device 44 transmits the encrypted memory authentication result information to the authentication determination unit 3212 of the host 3 (S160).

When the encrypted user authentication result information and the encrypted memory authentication result information are received, the authentication determination unit 3212 decrypts the encrypted user authentication result information (S170). The authentication determination unit 3212 performs the decryption using a first encryption key stored in the authentication determination unit 3212 or acquirable by the authentication determination unit 3212.

The authentication determination unit 3212 determines whether the decrypted user authentication result information includes the user authentication success notification or includes the user authentication failure notification (S180).

When the decrypted user authentication result information includes the user authentication failure notification (S180 [user authentication failure notification]), the authentication determination unit 3212 transmits the user authentication failure notification to the initialization processing unit 221 (S190). The authentication determination unit 3212 ends the operation after transmitting the user authentication failure notification. The initialization processing unit 221 ends the operation when the user authentication failure notification is received.

When the decrypted user authentication result information includes the user authentication success notification (S180 [user authentication success notification]), the authentication determination unit 3212 transmits the user authentication success notification and the encrypted memory authentication result information to the initialization processing unit 221 of the memory system 2 (S200).

When the user authentication success notification and the encrypted memory authentication result information are received, the initialization processing unit 221 decrypts the encrypted memory authentication result information (S210). The initialization processing unit 221 performs the decryption using a second encryption key that is stored in the initialization processing unit 221 or acquirable by the initialization processing unit 221.

The initialization processing unit 221 determines whether the decrypted memory authentication result information includes the memory authentication success notification or includes the memory authentication failure notification (S220). The initialization processing unit 221 determines whether the memory identification information of the decrypted memory authentication result information matches the memory identification information stored in the memory system 2, for example.

When the decrypted memory authentication result information includes the memory authentication failure notification (S220 [memory authentication failure notification]), the initialization processing unit 221 transmits the memory authentication failure notification to the authentication determination unit 3212 (S230). The initialization processing unit 221 ends the operation after transmitting the memory authentication failure notification. When the memory authentication failure notification is received, the authentication determination unit 3212 ends the operation.

When the decrypted authentication result memory information includes the memory authentication success notification (S220 [memory authentication success notification]), the initialization processing unit 221 transmits the memory authentication success notification and the revert start request (initialization start request) to the authentication determination unit 3212 of the host 3 (S240). The revert start request is an instruction for requesting the generation of the second revert start command. The second revert start command is an instruction for causing the memory system 2 to start the initialization of the memory 21.

When the memory authentication success notification and the revert start request are received, the authentication determination unit 3212 transmits the second revert start command to the initialization processing unit 221 of the memory system 2 (S250).

When the second revert start command is received, the initialization processing unit 221 starts the initialization of the memory 21. As a result, the revert sequence is executed (S250).

After the revert sequence is ended, the initialization processing unit 221 transmits a revert completion notification to the host 3 (S260). As a result, the operation of the information processing system 1 with respect to the revert is ended.

As described above, according to the first embodiment, the authentication server 4 is provided at a position different from the positions of the memory system 2 and the host 3. The user authentication processing device 42 performs the authentication of the user when the user authentication request command is received. The memory authentication processing device 44 performs the authentication of the memory system 2 when the memory authentication request command is received.

Since the PSID is printed on the casing of the memory system 2, a third party is possible to easily refer to the PSID. In the first embodiment, by performing the authentication of the user, it is possible to prevent the third party from easily executing the revert function to improve the security of the memory system 2.

In addition, in the first embodiment, the authentication server 4 is disposed outside the host 3 and the memory system 2. As described above, the host 3 may be, for example, a general-purpose server or PC that is available for use the host 3 by many unspecified users. In this case, the security of the memory system 2 is low. In the first embodiment, the authentication of the user who performs the revert is performed outside the host 3 and the memory system 2. As a result, the security can be improved as compared with a case in which the authentication of the user is completed by the host 3 and the memory system 2.

The user authentication processing device 42 encrypts the user authentication result information. As a result, it is possible to prevent the rewriting of the user authentication result information, and it is possible to prevent the disguise of the user. As a result, the security can be improved. The encryption is performed in accordance with, for example, an advanced encryption standard (AES). In addition, the authentication determination unit 3212 decrypts the encrypted user authentication result information.

The memory authentication processing device 44 encrypts the memory authentication result information. As a result, it is possible to prevent the rewriting of the memory authentication result information. As a result, the security can be improved. The encryption is performed, for example, in accordance with AES. In addition, the initialization processing unit 221 decrypts the encrypted memory authentication result information.

It should be noted that the host 3 is also possible to cause the authentication server 4 to start the authentication of the memory system 2 after the authentication of the user is completed.

At least a part of the information processing method in the information processing system 1 according to the present embodiment may be configured with software. In this case, a program that realizes at least some functions of the information processing method may be stored in a storage medium such as a flexible disk or a CD-ROM. The storage medium is not limited to an attachable and detachable medium such as a magnetic disk or an optical disk, and may be a fixed-type storage medium such as a hard disk device or a memory. The information stored in the storage medium is capable of being read out by, for example, a computer. A storage format of the storage medium is optional. The computer reads out a program from the storage medium, for example, and causes a CPU to execute an instruction described in the program based on the program. In addition, a program for realizing at least some functions of the information processing method may be distributed via a communication line (including wireless communication) such as the Internet. Further, the program may be distributed via a wired line or a wireless line such as the Internet or stored in a storage medium in a state in which the program is encrypted, modulated, or compressed.

The embodiments are examples, and the scope of the disclosure is not limited thereto. While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing system comprising:

a memory system including a memory configured to store data;

a host attachable to the memory system; and an authentication server located separately from the memory system and the host, wherein the host includes:

a user interface configured to receive input information from a user, a command generator configured to generate a command related to initialization of the memory, and a first user authenticator configured to authenticate the user based on confirming whether the input information of the user matches preset information, between the host and the authentication server, the memory system includes an initialization processor configured to initialize the memory, the authentication server includes a second user authenticator configured to authenticate the user, the user interface of the host configured to:

transmit an initialization command to the command generator when the input from the user is received, generate user identification information for identifying the user based on the input from the user, and transmit the generated user identification information to the first user authenticator, the command generator of the host configured to transmit a first command, causing the memory system to start the initialization of the memory to the initialization processor when the initialization command is received, the initialization processor of the memory system configured to transmit a first user authentication request for requesting authentication of the user, to the first user authenticator when the first command is received, the first user authenticator of the host further configured to transmit a second user authentication request for requesting the authentication of the user, and the user identification information to the second user authenticator when the user identification information and the first user authentication request are received, and the second user authenticator of the authentication server configured to generate user authentication result information based on the user identification information when the second user authentication request and the user identification information are received.

2. The information processing system according to claim 1, wherein the second user authenticator is further configured to authenticate the user based on comparing user identification information stored in advance and the received user identification information.

3. The information processing system according to claim 1, wherein the host further includes an authentication determinator configured to determine the authentication of the user, the second user authenticator is further configured to encrypt the generated user authentication result information, and transmit the encrypted user authentication result information to the authentication determinator, and the authentication determinator configured to decrypt the encrypted user authentication result information when the encrypted user authentication result information is received.

4. The information processing system according to claim 1, wherein the memory system further includes a memory identification information generator configured to generate memory identification information for identifying the memory system, the host further includes a first memory authenticator configured to authenticate the memory system based on confirming whether the memory is initializable, between the host and the authentication server, the authentication server further includes a second memory authenticator configured to authenticate the memory system, the initialization processor is configured to transmit the first user authentication request to the first memory authenticator and transmit the first command to the memory identification information generator when the first command is received, the memory identification information generator is configured to generate the memory identification information when the first command is received and transmit the generated memory identification information to the first memory authenticator, the first memory authenticator is configured to transmit a memory authentication request for requesting authentication of the memory system, and the memory identification information to the second memory authenticator when the memory identification information and the first user authentication request are received, and the second memory authenticator is configured to generate memory authentication result information by authenticating the memory system based on the memory identification information when the memory authentication request and the memory identification information are received.

5. The information processing system according to claim 4, wherein the second memory authenticator is configured to authenticate the memory system based on comparing memory identification information stored in advance and the received memory identification information.

6. The information processing system according to claim 4, wherein the second memory authenticator is configured to encrypt the generated memory authentication result information, and transmit the encrypted memory authentication result information to the initialization processor, and the initialization processor is configured to decrypt the encrypted memory authentication result information when the encrypted memory authentication result information is received.

7. The information processing system according to claim 4, wherein the host further includes an authentication determinator configured to determine authentication of the user, the initialization processor is configured to determine whether the generated memory authentication result information includes a memory authentication success notification or includes a memory authentication failure notification, and transmit, when the generated memory authentication result information includes the memory authentication success notification, an initialization start request for requesting generation of a second command, causing the memory system to start the initialization of the memory to the authentication determinator.

8. The information processing system according to claim 1, wherein the user interface is configured to transmit the initialization command and a physical presence security identifier (PSID) to the command generator when the input from the user is received, and the command generator is configured to transmit, when the initialization command and the PSID are received, the first command, causing the memory system corresponding to the received PSID to start the initialization of the memory to the initialization processor.

9. An information processing method of an information processing system including a memory system including a memory configured to store data, a host that attachable to the memory system, and an authentication server located separately from the memory system and the host, wherein the host includes:

a user interface configured to receive input information from a user, a command generator configured to generate a command related to initialization of the memory, and a first user authenticator configured to authenticate the user by confirming whether the input information of the user matches preset information between the host and the authentication server, the memory system includes an initialization processor configured to initialize the memory, and the authentication server includes a second user authentication processor configured to authenticate the user, the information processing method comprising:

transmitting, via the user interface, an initialization command to the command generator when the input from the user is received;

generating, via the user interface, user identification information for identifying the user, based on the input from the user; and transmitting, via the user interface, the generated user identification information to the first user authenticator;

transmitting, via the command generator, a first command, causing the memory system to initialize of the memory to the initialization processor when the initialization command is received;

transmitting, via the initialization processor, a first user authentication request for requesting the authentication of the user, to the first user authenticator when the first command is received;

transmitting, via the first user authenticator, a second user authentication request for requesting the authentication of the user, and the user identification information to the second user authenticator when the user identification information and the first user authentication request are received; and generating, via the second user authentication processor, user authentication result information based on the user identification information when the second user authentication request and the user identification information are received.

10. The information processing method according to claim 9, further comprising:

authenticating, via the second user authenticator, the user based on comparing user identification information stored in advance and the received user identification information.

11. The information processing method according to claim 9, wherein the host further includes an authentication determinator configured to determine the authentication of the user, the method further comprising:

encrypting, via the second user authenticator, the generated user authentication result information, and transmitting the encrypted user authentication result information to the authentication determinator; and decrypting, via the authentication determinator, the encrypted user authentication result information when the encrypted user authentication result information is received.

12. The information processing method according to claim 9, wherein the memory system further includes a memory identification information generator configured to generate memory identification information for identifying the memory system, the host further includes a first memory authenticator configured to authenticate the memory system based on confirming whether the memory is initializable, between the host and the authentication server, the authentication server further includes a second memory authenticator configured to authenticate the memory system, the method further comprising:

transmitting, via the initialization processor, the first user authentication request to the first memory authenticator and transmitting the first command to the memory identification information generator when the first command is received;

generating, via the memory identification information generator, the memory identification information when the first command is received and transmitting the generated memory identification information to the first memory authenticator;

transmitting, via the first memory authenticator, a memory authentication request for requesting authentication of the memory system, and the memory identification information to the second memory authenticator when the memory identification information and the first user authentication request are received; and generating, via the second memory authenticator, memory authentication result information by authenticating the memory system based on the memory identification information when the memory authentication request and the memory identification information are received.

13. The information processing method according to claim 12, further comprising:

authenticating, via the second memory authenticator, the memory system based on comparing memory identification information stored in advance and the received memory identification information.

14. The information processing method according to claim 12, further comprising:

encrypting, via the second memory authenticaton, the generated memory authentication result information, and transmitting the encrypted memory authentication result information to the initialization processor; and decrypting, via the initialization processor, the encrypted memory authentication result information when the encrypted memory authentication result information is received.

15. The information processing method according to claim 12, wherein the host further includes an authentication determinator configured to determine authentication of the user, the method further comprising:

determining, via the initialization processor, whether the generated memory authentication result information includes a memory authentication success notification or includes a memory authentication failure notification, and transmitting, when the generated memory authentication result information includes the memory authentication success notification, an initialization start request for requesting generation of a second command, causing the memory system to start the initialization of the memory to the authentication determinator.

16. The information processing method according to claim 9, further comprising:

transmitting, via the user interface, the initialization command and a physical presence security identifier (PSID) to the command generator when the input from the user is received; and transmitting, via the command generator, when the initialization command and the PSID are received, the first command, causing the memory system corresponding to the received PSID to start the initialization of the memory to the initialization processor.

* * * * *